United States Patent [19]

Richter

[11] 4,169,087
[45] Sep. 25, 1979

[54] PRODUCT AND PROCESS OF PREPARING TETRAFLUOROETHYLENE POLYMER AQUEOUS DISPERSIONS

[75] Inventor: Robert F. Richter, Washington, W. Va.

[73] Assignee: E. I. DuPont de Nemours and Co., Wilmington, Del.

[21] Appl. No.: 869,271

[22] Filed: Jan. 13, 1978

Related U.S. Application Data

[63] Continuation-in-part of Ser. No. 827,158, Aug. 24, 1977, abandoned.

[51] Int. Cl.$^2$ .............................................. C08L 27/18
[52] U.S. Cl. ...................... 260/29.6 F; 260/29.6 MP
[58] Field of Search ................... 260/29.6 F, 29.6 MP

[56] References Cited

U.S. PATENT DOCUMENTS 3,489,595  1/1970  Brown .............................. 260/29.6 F
3,830,770  8/1974  Ribbans .......................... 260/29.6 F

FOREIGN PATENT DOCUMENTS 40-18424  8/1965  Japan .................................. 260/29.6 F

OTHER PUBLICATIONS

The Condensed Chemical Dictionary, 6th Edition, Reinhold Pub. Corp., New York, 1961, p. 1051.

*Primary Examiner*—James H. Derrington

[57] ABSTRACT

Heretofore, the only practical way known to decrease the viscosity of an ionically thickened tetrafluoroethylene polymer dispersion has been by diluting it with water. This decreases the solids level, which can have an undesirable effect on subsequent processing. It has now been discovered that if the tetrafluoroethylene polymer dispersion contains a sodium phosphate in which the ratio of $Na_2O$ to $P_2O_5$ is between 1:1 and 3:1, the viscosity of the dispersion can be decreased by adding selected inorganic electrolytes.

16 Claims, No Drawings

4,169,087

PRODUCT AND PROCESS OF PREPARING TETRAFLUOROETHYLENE POLYMER AQUEOUS DISPERSIONS

CROSS REFERENCE TO RELATED APPLICATION

This application is a continuation-in-part of application Ser. No. 827,158, filed Aug. 24, 1977 now abandoned.

FIELD OF THE INVENTION

This invention relates to viscosity-controllable aqueous dispersions of tetrafluoroethylene polymers.

BACKGROUND

Inorganic electrolytes have been used to thicken polytetrafluoroethylene aqueous dispersions, as evidenced by Ribbans U.S. Pat. No. 3,830,770. Thickening of aqueous dispersions, i.e., increasing the viscosity of the dispersions, is ordinarily carried out to aid in maintaining stability of the dispersions, especially during storage. In particular, thickening of the dispersions aids in retarding the settling out of various ingredients, such as inert filler materials.

Addition of an inorganic electrolyte to such a dispersion results in an increase in the viscosity of the dispersion and thus causes it to thicken. Heretofore, once a dispersion had been thickened, viscosity could only be lowered by adding water. Addition of water dilutes the dispersion and results in a change in the concentration of the ingredients. Since many applications involve the use of uniform batches of dispersion, it would be desirable to be able to lower the viscosity of a dispersion without changing the volume (i.e., concentration).

SUMMARY OF THE INVENTION

It has now been discovered that if a selected sodium phosphate is used as the inorganic electrolyte to increase the viscosity of the dispersion, the viscosity can subsequently be lowered by adding certain other solid inorganic electrolytes in small amounts. Since no liquid is added to the thickened dispersion, the viscosity is lowered without substantially changing the volume of the dispersion.

Specifically, the thickened dispersion in which viscosity can be lowered in the manner described above is an aqueous dispersion consisting essentially of
(a) water,
(b) 45 to 75% by weight (based on weight of polymer, water and nonionic surfactant) of a tetrafluoroethylene polymer having a melt viscosity greater than $1 \times 10^9$ poises at 380° C.,
(c) 3 to 11% by weight based on weight of polymer, of a nonionic surfactant, and
(d) 0.2 to 90 g per kg of dispersion of a sodium phosphate having a mole ratio of $Na_2O$ to $P_2O_5$ of between 1:1 and 3:1, inclusive.

DESCRIPTION OF THE INVENTION

The tetrafluoroethylene polymer employed herein is the non-melt-fabricable class of tetrafluoroethylene polymer, as opposed to the lower melting, melt-fabricable class of tetrafluoroethylene polymer. The difference between these classes of tetrafluoroethylene polymers can be determined by melt viscosity. Non-melt-fabricable polymers have high melt viscosities, e.g., $1 \times 10^9$ poise or more at 380° C.; while melt-fabricable polymers have much lower melt viscosities, e.g. on the order of $1 \times 10^4$ to $1 \times 10^6$. Melt viscosity of the polymer depends in large part upon the amount, if any, of comonomer present. Generally, the more conomomer present, the lower the melt viscosity. Melt viscosity also depends on the molecular weight of the comonomer. Thus non-melt-fabricable tetrafluoroethylene polymers employed herein include polytetrafluoroethylene and copolymers of tetrafluoroethylene and different perfluorinated ethylenically unsaturated monomers present in an amount which does not cause the melt viscosity of the resultant copolymer to be below $1 \times 10^9$ poise at 380° C. One preferred class of ethylenically unsaturated monomers is perfluoro (alkyl vinyl ethers) of 3–7 carbon atoms. Generally, the copolymer can contain up to between about 0.1–0.5% by weight of these comonomers before the melt viscosity falls below $1 \times 10^9$ poise. The maximum amount depends upon the molecular weight of the comonomer. For perfluoro (propyl vinyl ether) the upper limit will be about 0.5%; this limit will be lower as the molecular weight of the ether increases. Another preferred class is perfluoro (terminally unsaturated olefins) of 3–7 carbon atoms. Generally, the copolymer can contain up to between about 0.5–2.5% by weight of these comonomers before the melt viscosity falls below $1 \times 10^9$ poise. Again, the maximum amount depends on the molecular weight of the comonomer. For hexafluoropropylene the upper limit will be about 2.5%. This limit will be lower as the molecular weight of the olefin increases.

The tetrafluoroethylene polymers employed herein are prepared by the aqueous dispersion preparative method, rather than by the suspension polymerization method. In the aqueous dispersion method, a dispersion of the polymer is obtained by polymerization in an aqueous medium containing dispersing agent, such as from 0.2 to 0.8% by weight (based on water) ammonium polyfluorocarboxylate containing 7–10 carbon atoms, to form a dispersion of tetrafluoroethylene polymer particles in water. These particles are substantially round and have an average diameter generally within the range of 0.1 to 0.5 micron; polymer concentration is not critical, but generally ranges between 45 and 75% by weight based on weight of dispersion (polytetrafluoroethylene plus water plus non-ionic surfactant). Preferred tetrafluoroethylene polymer concentration in the dispersion is 55 to 65% based on weight of dispersion. The pH of the dispersion may be adjusted, if desired, to at least 7 by the addition of a basic compound in order to minimize corrosive attack on metal surfaces. On coagulation, the resulting powder obtained is usually referred to in the art as "fine powder" (on the other hand, the powder obtained from suspension polymerization is usually referred to as "granular" resin.).

The nonionic surfactant component in the dispersion should be present in an amount of at least 3% by weight of the polymer. The surfactant aids in maintaining the polymer particles suspended in the dispersion. If the nonionic surfactant content is increased to about 11% or more, the sintered or fused product obtained from the dispersion will have a distinct brownish color. If it is desired to minimize discoloration, a concentration of surfactant as close to 5% by wt. as possible may be used. As polymer solids concentration in the dispersion to be thickened is decreased from 60% by weight, greater amounts of the nonionic surfactant are required to assist in thickening without coagulating the polymer. A preferred amount of surfactant is from 5 to 8% by weight.

The nonionic surfactant is any nonionic surfactant which is soluble in water at room temperature (20°-25° C.) at the concentration desired. The surfactant can be composed of a single nonionic surfactant or a mixture of nonionic surfactants. Typically, the nonionic surfactants are prepared as reaction products of ethylene oxide, which imparts a hydrophilic moiety to the surfactant, with other compounds which impart hydrophobic moieties to the surfactant, such as propylene oxide, amines, saturated and unsaturated aliphatic alcohols and aliphatic acids, and alkyl phenols. For purposes of illustration, some of the foregoing mentioned nonionic surfactants are further illustrated hereinafter by the formulae:

$$R'[O(A)_nH]_x$$

wherein $(A)_n$ is the group $+C_2H_4O+_n$ or a mixture of the groups $+C_2H_4O+_a$ and $+C_3H_6O+_b$, wherein n in each instance is an integer of from 2 to 50 and preferably 2 to 18, b is an integer of 0 to 30, and a is an integer of at least 2, a+b being equal to n; x is an integer of 1, 2, or 3; and R' is an aliphatic hydrocarbon group which can be saturated or unsaturated, straight-chain, branched, or cyclic, and will generally contain from 8 to 24 carbon atoms, preferably from 8 to 18 carbon atoms; examples of R groups include oleyl, stearyl, tridecyl, lauryl, decyl and the groups derived from aliphatic glycols and triols; $R^2—C_6H_4O(B)_mH$, wherein B is the group $+C_2H_4O+_c$ or a mixture of the groups $+C_2H_4O+_c$ and $+C_3H_6O+_d$, wherein m in each instance is an integer of from 2 to 50 and preferably 8 to 20, d is an integer of 0 to 30, c is an integer of at least 2, c+d being equal to m; $R^2$ is a monovalent aliphatic and usually saturated hydrocarbon group containing 4 to 20 carbon atoms and preferably 8 to 12 carbon atoms;

$$R^4—N[(CH_2CH_2O)_pH]_z$$
$$\text{with } R^3$$

and $$R^4—CON[(CH_2CH_2O)_pH],$$
$$\text{with } R^3$$

wherein p is an integer of 2 to 50; z is an integer of 1 or 2; $R^4$ is an alkyl group containing 1 to 8 carbon atoms; $R^3$ is $(CH_2CH_2O)_pH$, when z is 2 and an alkyl group of 1 to 8 carbon atoms when z is 1; with the proviso that at least 5 carbon atoms are provided by $R^3+R^4$; the polyalkylene oxide block copolymers of the formula $$HO(C_2H_4O)_e(C_3H_6O)_f(C_2H_4O)_gH,$$

wherein f is an integer of from 15 to 65 and e and f are integers sufficiently large that e+g total 20 to 90 percent of the total weight of the polymer. For each of the surfactants of the foregoing described formulae, the hydrophobic and hydrophilic moieties are proportioned such and the total molecular weight is such that the surfactant is water soluble. Specific surfactants within these formulae include $CH_3(CH_2)_4CH_2(OCH_2CH_2)_3OH$; $CH_3(CH_2)_6CH_2(OCH_2CH_2)_3OH$; $CH_3(CH_2)_{10}CH_2(OCH_2CH_2)_{12}(OCH(CH_3)CH_2)_5OH$; $CH_3(CH_2)_8CH_2(OCH_2CH_2)_{10}OH$; $CH_3(CH_2)_8CH_2(OCH_2CH_2)_5OH$; and

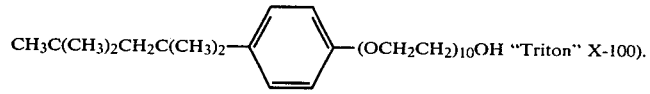

$CH_3C(CH_3)_2CH_2C(CH_3)_2$—⟨benzene ring⟩—$(OCH_2CH_2)_{10}OH$ "Triton" X-100).

The sodium phosphates useful in this invention are commonly defined by the stoichiometric ratio of their oxides, i.e., ratio of $Na_2O$ to $P_2O_5$. In this invention, useful phosphates are ones in which the ratio of $Na_2O$ to $P_2O_5$ varies from 1-to-1 to 3-to-1. Preferably the ratio is between 1.05-to-1 and 1.2-to-1. The sodium phosphates are described in Phosphorus and Its Compounds, J. R. Van Wazer, Interscience Publishers, Inc. N.Y., 1958 p. 775 et seq. The phosphate is present in the dispersion in an amount between 0.2–90 g/kg dispersion. If desired 0.2–14 g/kg dispersion can be used. The phosphate may be added either in solid (powder or granule) form or in aqueous solution.

To prepare the dispersions of this invention the phosphate is simply added, usually by stirring it in, to an aqueous dispersion of the polymer and the surfactant. Neither temperature nor pressure is critical in the preparation. During addition, the viscosity of the dispersion increases due to the presence of the phosphate. Preferably, sufficient phosphate is added to result in a dispersion having a viscosity of at least 50 centipoise, and most preferably between about 50 and 500 centipose.

The use of a phosphate defined herein is critical to this invention, for it is only when the phosphate is used to thicken the dispersion that the dispersion can be thinned merely by adding a selected inorganic electrolyte. Ordinarily, the addition of inorganic electrolytes increases the viscosity of dispersions of tetrafluoroethylene polymers and the addition of more, but different inorganic electrolytes continues to raise the viscosity. However, when such dispersions are initially thickened with a sodium phosphate defined herein, addition of certain inorganic electrolytes surprisingly results in a decrease in viscosity. Inorganic electrolyes which so lower the viscosity include the nitrates of Group II A (of the Periodic Chart) cations, Fe, Co, Ni and Al. Other inorganic electrolytes which lower the viscosity include calcium acetate, barium acetate, strontium acetate and barium hydroxide. In most instances, these electrolytes decrease the viscosity only so long as their concentration in the dispersion is less than about 1 g per 454 g of dispersion. Above that concentration, the electrolytes tend to increase viscosity. Neither temperature nor pressure is critical during addition of these electrolytes. The electrolytes are simply stirred into the dispersion to lower the dispersion viscosity.

The advantages of this invention are observed in the storage, shipment, and use of the dispersions. The increase in viscosity enhances the stability of the dispersion against settling out of the ingredients; and when the dispersions are ready for their end application, usually as coating materials on fabrics and gaskets, they can be used directly or can be thinned by adding an inorganic electrolyte described further above.

The enhancement of stability against settling of ingredients is particularly advantageous when an inert filler material is present in the dispersion. Fillers employed with tetrafluoroethylene polymer dispersions are usually particulate solids that are insoluble in the dispersion. The fillers usually range from 10 to 70 microns in size (median size based on weight as measured by a micromerograph instrument). In contrast polymer particles in the dispersion are of colloidal size, usually about 0.1–0.5 microns in size. Because of the large size of the fillers, the filler particles tend to settle out of the dispersion. Thickening the dispersion retards this settling process. Representative fillers include inorganic mineral fillers such as diatomaceous earth, limestone, talc, carbon, powdered metal, glass beads, and mineral fibers. Fillers, when present, usually comprise 20–40% by weight based on weight of dispersion.

The dispersions of this invention, which have been thickened with the sodium phosphates, exhibit improved storage stability over art dispersions such as those thickened with Ba(NO$_3$)$_2$ at comparable viscosities. At about six months, the Ba(NO$_3$)$_2$ thickened dispersion had appreciably settled whereas after about nine months the sodium phosphate thickened dispersion had not appreciably settled.

Melt viscosities of the tetrafluoroethylene polymers are calculated by measuring the tensile creep of a sintered piece held at 380° C. Specifically, 12 g. of molding powder is placed in a 7.6 cm. diameter mold between 0.152 cm. rubber cauls and paper spacers. The mold is then heated at 100° C. for 1 hour. Pressure is then slowly applied on the mold until a value of 140.6 kg./cm.$^2$ is obtained. This pressure is held for 5 minutes and then released slowly. After the sample disc is removed from the mold and separated from the cauls and paper spacers, it is sintered at 380° C. for 30 minutes. The oven is then cooled to 290° C. at a rate of about 1° C. a minute and the sample is removed. A crack-free rectangular sliver with the following dimensions is cut: 0.152 to 0.165 cm. wide, 0.152 to 0.165 cm. thick, and at least 6 cm. long. The dimensions are measured accurately and the cross-sectional area is calculated. The sample sliver is attached at each end to quartz rods by wrapping with silver-coated copper wire. The distance between wrappings is 4.0 cm. This quartz rod-sample assembly is placed in a columnar oven where the 4 cm. test length is brought to a temperature of 380°±2° C. A weight is then attached to the bottom quartz rod to give a total weight suspended from the sample sliver of about 4 g. The elongation measurements vs. time are obtained, and the best average value for the creep rate in the interval between 30 and 60 minutes is measured. The specific melt viscosity, which may be better called apparent melt viscosity, is then calculated from the relationship $$\eta app = (WL_t g)/3(dL_t/dt)A_t$$

where
 $\eta app$ = (apparent) melt viscosity in shear, poises
 W = tensile load on sample, g
 $L_t$ = length of sample (at 380° C.) cms. (4.32 cm)
 g = gravitational constant, 980 cm./sec.$^2$
 $(dL_t/dt)$ = rate of elongation of sample under load = -slope of elongation vs. time plot, cm./sec.
 $A_t$ = cross-sectional area of sample (at 380° C.), cm$^2$ (area increases 37% at 380° C. over that at room temperature).

Viscosities of aqueous dispersions described herein are measured using a Brookfield viscometer (model LVT) operating at 60 r.p.m. at 25° C. using a #2 spindle. The spindle is lowered into the dispersion, and the viscometer is turned on and allowed to equilibrate for one minute before a reading is taken. Readings were taken in triplicate and averaged. The averaged value was multiplied by 5 to obtain the viscosity in centipoise (cps).

The folllowing Examples illustrate the invention.

EXAMPLE 1

Thickening Effect of Sodium Phosphate of Na$_2$O:P$_2$O$_5$ Ratio of 1.15 to 1

PART A

To 374.6 g of polytetrafluoroethylene homopolymer dispersion (polymer melt viscosity greater than $1 \times 10^9$ poise at 380° C.) containing 70.9% solids and 4.0% (based on polymer) "Triton" X-100 (nonionic surfactant) was added 75.5 g demineralized water (used to adjust concentration without introducing impurities). After this dispersion was warmed to about 35° C., 3.41 g of "Triton" X-100 was added and the dispersion stirred 5 minutes to completely dissolve the surfactant. The dispersion was then cooled to room temperature (22° C.). The dispersion contained 58.5% solids and 5.5% "Triton" X-100. Its viscosity was determined.

This dispersion was stirred using a propeller-type stirrer at a speed adequate to mix the ingredients without whipping air into the dispersion. To this stirred dispersion, 0.2 g of sodium phosphate having an Na$_2$O:P$_2$O$_5$ ratio of 1.15 to 1 buffered by sodium carbonate and sodium bicarbonate was added and the stirring was continued for 5 minutes before the viscosity was measured. The mixture of sodium phosphate and buffer used was obtained commercially under the tradename "Calgon". The addition of 0.2 g of the mixture was repeated 9 times. After each addition, the viscosity was measured. Then the addition was increased to 0.4 g and the procedure was repeated 4 times. Viscosity was measured after each addition.

The viscosity of the original dispersion and the viscosity measured after each addition of phosphate is shown as follows:

| Amount of Sodium Phosphate | |
|---|---|
| Present (g) | Viscosity (cps) |
| 0 | 12 |
| 0.2 | 10 |
| 0.4 | 12 |
| 0.6 | 12 |
| 0.8 | 22 |
| 1.0 | 45 |
| 1.2 | 73 |
| 1.4 | 100 |
| 1.6 | 125 |
| 1.8 | 140 |
| 2.0 | 160 |
| 2.4 | 185 |
| 2.8 | 205 |
| 3.2 | 223 |
| 3.6 | 241 |

PART B

To a polytetrafluoroethylene homopolymer dispersion (454 g) (like that used in Part A except that it contained 55.0% solids and 5.16% nonionic surfactant "Triton" X-100) was added 8.0 g of sodium phosphate having a Na$_2$O:P$_2$O$_5$ ratio of 1.15 to 1 (present in the form of "Calgon"). The ingredients were agitated. The viscosity rose to 155 cps. Two more additions of sodium phosphate ($Na_2O:P_2O_5$ ratio 1.15) (0.7 and 0.8 g, respectively) resulted in viscosities of 177 cps and 205 cps respectively. Addition of additional 20 g of sodium phosphate ($Na_2O:P_2O_2$ ratio 1.15) to the thickened dispersion resulted in a viscosity of 1600 cps. Total amount of sodium phosphate added was about 65 g/kg of dispersion.

EXAMPLE 2

Thinning Effect of $Ba(NO_3)_2$ on a Sodium Phosphate/Silicon Dioxide Filled Thickened Dispersion A polytetrafluoroethylene homopolymer dispersion (454 g) containing 61% total solids of which 20% of the 61% is silicon dioxide (in the form of "min-u-sil"-5, micron sized silica), 6.25% nonionic surfactant "Triton"X-100, and enough sodium phosphate having an $Na_2O:P_2O_5$ ratio of 1.15 to 1 (present in the form of "Calgon") to provide a viscosity of 135 cps was placed in a container and mixed with a propeller-type stirring blade at a speed just enough to agitate the ingredients. To the dispersion, 0.2 g of $Ba(NO_3)_2$ was added and the mixture was stirred 5 minutes before the viscosity was measured. This procedure was repeated until a total of 1.6 g of $Ba(NO_3)_2$ had been added to the dispersion.

The viscosity of the original sodium phosphate containing-dispersion and the viscosity measured after each addition of barium nitrate is shown as follows:

| Amount of Barium Nitrate Present (g) | Viscosity (cps) |
| --- | --- |
| 0 | 135 |
| 0.2 | 118 |
| 0.4 | 105 |
| 0.6 | 95 |
| 0.8 | 95 |
| 1.0 | 95 |
| 1.2 | 97 |
| 1.4 | 100 |
| 1.6 | 112 |

EXAMPLE 3

Thickening Effect of Sodium Phosphate of $Na_2O:P_2O_5$ Ratio of 3:1 and Thinning Effect of $Ba(NO_3)_2$ The viscosity of a polytetrafluoroethylene homopolymer dispersion containing 60.6% solids and 5.5% nonionic surfactant "Triton" X-100 was measured to be 32.5 cps. To 908 g of this dispersion was added 1.0 g $3Na_2O:P_2O_5$ and the dispersion was stirred 5 minutes to mix the ingredients. The viscosity was measured at 27.5 cps. The addition of 1.0 g $3Na_2O:P_2O_5$ was repeated 3 times to give respectively viscosities of 26.0 cps, 35.0 cps, 100.0 cps.

To 454 g of the above $3Na_2O:P_2O_5$ thickened dispersion (viscosity 100.0 cps), 1.0 g of $Ba(NO_3)_2$ was added and the dispersion stirred 5 minutes. The viscosity was determined to be 37.5 cps.

The ineffectiveness of an alkali metal nitrate to thin the thickened dispersion is shown by the fact that when 1.0 g of $KNO_3$ was added to 454 g of the above $3Na_2O:P_2O_5$ thickened dispersion (viscosity 100.0 cps) and the mixture stirred 5 minutes, the viscosity was 157.0 cps.

EXAMPLE 4

Thickening Effect of Sodium Phosphate of $Na_2O:P_2O_5$ Ratio of 2:1 and Thinning Effect of $Ba(NO_3)_2$ The procedure of Example 3 was followed. The following table shows the viscosities obtained.

| Total $2Na_2O:P_2O_5$ Added | Viscosity of Dispersion |
| --- | --- |
| 0.0 g | 31.0 cps |
| 1.0 g | 25.0 cps |
| 2.0 g | 22.5 cps |
| 3.0 g | 60.0 cps |
| 4.0 g | 155.0 cps |

454 g of the 155.0 cps dispersion were mixed with 1.0 g $Ba(NO_3)_2$. The viscosity of the $Ba(NO_3)_2$ thinned dispersion was 87.5 cps.

To another 454 g of the 155.0 cps dispersion, was added 1.0 g $KNO_3$. The viscosity after addition of $KNO_3$ increased to 185.5.

EXAMPLE 5

Thickening Effect of Sodium Phosphate of $Na_2O:P_2O_5$ Ratio of 5:3 and Thinning Effect of $Ba(NO_3)_2$ The procedure of Example 3 was followed. The following table shows the viscosities obtained.

| Total $5Na_2O:3P_2O_5$ Added | Viscosity |
| --- | --- |
| 0.0 g | 30.0 cps |
| 2.0 g | 28.5 cps |
| 3.0 g | 35.5 cps |
| 4.0 g | 200.0 cps |
| 5.0 g | 382.5 cps | b 454 g of the 382.5 cps dispersion were mixed with 1.0 g $Ba(NO_3)_2$. The viscosity of the thinned dispersion was 350.0 cps.

To another 454 g of the 382.5 cps dispersion was added 1.0 g $KNO_3$. The viscosity after addition of $KNO_3$ increased to 423.0 cps.

EXAMPLE 6

Thickening Effect on a Glass Bead Filler-Containing Dispersion and Thinning Effect of $Ba(NO_3)_2$ A dispersion of polytetrafluoroethylene homopolymer containing 71.6% solids and 2.96% "Triton" X-100 was prepared. To 2283 g of this dispersion was added 441 g demineralized water and 54.6 g "Triton" X-100. After addition of 2.5 g sodium phosphate (in the form of "Calgon") having an $Na_2O:P_2O_5$ ratio of 1.15:1, and 390 g glass beads having an average bead size by weight of about 29–30 microns, the viscosity was measured at 180 cps. To 227 g of the thickened dispersion, 0.2 g of $Ba(-NO_3)_2$ was added. The dispersion was stirred for 5 minutes to dissolve the salt and the viscosity measured. The $Ba(NO_3)_2$ was added 4 times in increments 1.0 g each time. The viscosity after each addition is shown by the following table:

| Total Ba(NO₃)₂ Added | Viscosity |
|---|---|
| 0.0 g | 180 cps |
| 0.2 g | 145 cps |
| 0.4 g | 145 cps |
| 0.6 g | 185 cps |
| 0.8 g | 210 cps |
| 1.0 g | 230 cps |

Thinning results similar to that using Ba(NO₃)₂ are obtained with the other inorganic electrolytes mentioned herein as thinning additives.

I claim:

1. An aqueous dispersion consisting essentially of
   (A) Water,
   (B) 45–75% by weight tetrafluoroethylene polymer, based on weight of water, polymer and nonionic surfactant, said polymer having a melt viscosity of at least $1 \times 10^9$ poise at 380° C.
   (C) 3–11% by weight nonionic surfactant, based on weight polymer,
   (D) 0.2–90 g per kg of dispersion of a sodium phosphate having a mole ratio of $Na_2O:P_2O_5$ between 1.05-to-1 and 1.2-to-1 inclusive.

2. The aqueous dispersion of claim 1 which additionally contains an inert filler material.

3. The aqueous dispersion of claim 1 wherein the polymer is polytetrafluoroethylene.

4. The aqueous dispersion of claim 3 which additionally contains a filler material.

5. The aqueous dispersion of claim 4 wherein the sodium phosphate has a mole ratio of $Na_2O:P_2O_5$ of about 1.15-to-1.

6. Process for reducing the viscosity of an aqueous dispersion consisting essentially of
   (A) Water,
   (B) 45–75% by weight tetrafluoroethylene polymer, based on weight of water, polymer, and nonionic surfactant, said polymer having a melt viscosity of at least $1 \times 10^9$ poise at 380° C.,
   (C) 3–11% by weight nonionic surfactant, based on weight of polymer,
   (D) 0.2–90 g per kg of dispersion of a sodium phosphate having a mole ratio of $Na_2O:P_2O_5$ between 1.05-to-1 and 1.2-to-1 inclusive, which comprises mixing said dispersion with an inorganic electrolyte selected from the class consisting of nitrates of Group II A metals; ferrous or ferric nitrate; cobalt nitrate; nickel nitrate; aluminum nitrate; calcium, barium or strontium acetate; and barium hydroxide, in an amount sufficient to reduce the viscosity of the dispersion to a value lower than prior to said mixing.

7. Process of claim 6 wherein said aqueous dispersion additionally contains an inert filler material.

8. Process of claim 7 wherein the tetrafluoroethylene polymer is polytetrafluoroethylene.

9. An aqueous dispersion consisting essentially of
   (A) Water,
   (B) 45–75% by weight tetrafluoroethylene polymer, based on weight of water, polymer and nonionic surfactant, said polymer having a melt viscosity of at least $1 \times 10^9$ poise at 380° C.,
   (C) 3–11% by weight nonionic surfactant, based on weight of polymer,
   (D) 0.2–13 g per kg of dispersion of a sodium phosphate having a mole ratio of $Na_2O:P_2O_5$ between 1.05-to-1 and 1.2-to-1 inclusive.

10. The aqueous dispersion of claim 9 which additionally contains an inert filler material.

11. The aqueous dispersion of claim 9 wherein the polymer is polytetrafluoroethylene.

12. The aqueous dispersion of claim 11 which additionally contains a filler material.

13. The aqueous dispersion of claim 12 wherein the sodium phosphate has a mole ratio of $Na_2O:P_2O_5$ of about 1.15-to-1.

14. Process for reducing the viscosity of an aqueous dispersion consisting essentially of
   (A) Water,
   (B) 45–75% by weight tetrafluoroethylene polymer, based on weight of water, polymer, and nonionic surfactant, said polymer having a melt viscosity of at least $1 \times 10^{10}$ poise at 380° C.,
   (C) 3–11% by weight nonionic surfactant, based on weight of polymer,
   (D) 0.2–13 g per kg of dispersion of a sodium phosphate having a mole ratio of $Na_2O:P_2O_5$ between 1.05-to-1 and 1.2-to-1 inclusive, which comprises mixing said dispersion with an inorganic electrolyte selected from the class consisting of nitrates of Group II A metals; ferrous or ferric nitrate; cobalt nitrate; nickel nitrate; aluminum nitrate; calcium, barium or strontium acetate; and barium hydroxide, in an amount sufficient to reduce the viscosity of the dispersion to a value lower than prior to said mixing.

15. Process of claim 14 wherein said aqueous dispersion additionally contains an inert filler material.

16. Process of claim 15 wherein the tetrafluoroethylene polymer is polytetrafluoroethylene.

* * * * *